M. WILBUSCHEWITSCH.
APPARATUS FOR PRODUCING CATALYSTS.
APPLICATION FILED JULY 19, 1911.
1,016,864.
Patented Feb. 6, 1912.
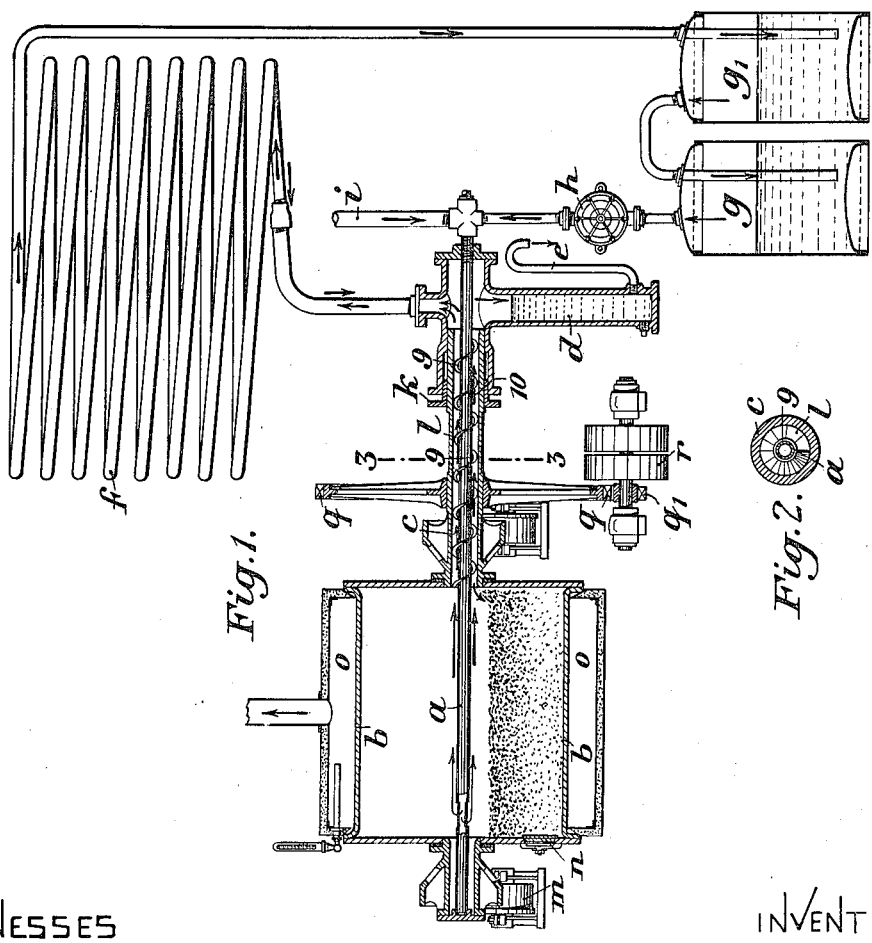

UNITED STATES PATENT OFFICE.

MOSE WILBUSCHEWITSCH, OF NISCHNINOVGOROD, KANAVINO, RUSSIA.

APPARATUS FOR PRODUCING CATALYSTS.

1,016,864.     Specification of Letters Patent.     Patented Feb. 6, 1912.

Original application filed January 12, 1911, Serial No. 602,322. Divided and this application filed July 19, 1911. Serial No. 639,452.

*To all whom it may concern:*

Be it known that I, MOSE WILBUSCHEWITSCH, a subject of the Russian Emperor, and resident of Nischninovgorod, Kanavino, Russia, have invented certain new and useful Improvements in Apparatus for Producing Catalysts, of which the following is a specification.

My invention relates to improvements in apparatus for producing catalysts which are adapted for use in contact processes of various kinds, and which are particularly designed for use in processes of oxidizing and reducing fats. And the object of the improvements is to provide an apparatus by means of which a particularly active catalyst can be manufactured in an economical way.

For the purpose of explaining the invention an example embodying the same has been shown in the accompanying drawings in which the same letters of reference have been used in all the views to indicate corresponding parts.

In said drawings Figure 1 is a diagrammatical side view partly in section, and Fig. 2 is a cross-section taken on the line 3—3 of Fig. 1.

In the example shown in the drawings the apparatus consists of a cylindrical drum $b$ mounted to rotate on rollers $m$ and provided with a heating jacket $o$. The said drum is charged through an inlet-opening $n$ with a previously prepared mixture of an insoluble, porous, inorganic carrier, such for example as clay, kieselguhr, pumice-stone, etc., with a suitable contact-substance, such as copper, iron, nickel or the like, which has been dissolved by an acid, such as sulfuric acid and converted into the carbonate by means of sodium-carbonate. To one of the end plates of the drum a tubular shaft $c$ is secured, the free end of which is guided in a stuffing-box $k$ provided in a lateral stud of an upright tubular receptacle $d$. On the said shaft a spur-gear $q$ is mounted which is in mesh with a pinion $q^1$ adapted to be rotated by means of a belt pulley $r$. By means of the gearing $q^1$, $q$ the drum $b$ is slowly rotated, and during such rotation it is heated to about 500° C. Hydrogen is then forced into the drum through a pipe $a$, located coaxially within the hollow shaft $c$ and connected at one end with a supply-tube $i$. The hydrogen passes through the material to be reduced, and from the latter it is successively conducted with the gases of reaction through an automatically-operating dust-collector 9 connected with the drum and formed of a spiral conveyer 1 arranged in the space between the tubes $a$ and $c$, a cooling coil $f$, and purifying vessels $g$, $g^1$ containing respectively acid and caustic soda lye, or similar purifying media. After thus being regenerated, the hydrogen is returned into the drum by means of a pump $h$. The water produced by the reduction is condensed in the coil $f$ from which it is conducted into the vessel $d$ from which it is discharged through a goose-neck overflow-pipe $e$. When the reduction is finished, no further water flows from the vessel $d$. In the example shown, the dust-collector 9 by means of which the hydrogen escaping from the drum is prevented from carrying along the particles of dust is constructed in the form of a spiral conveyer 1 that extends freely around the tube $a$ but rotates with the hollow shaft $c$. The dust moves through the hollow shaft $c$ in the direction of the arrow 10 and owing to the difference in the speed of the gases and dust the latter is deposited on the bottom of the shaft $c$, and returned into the drum by the conveyer 1, which is rotated in a direction opposite to the direction of motion of the gases.

I claim:

1. In an apparatus for producing a catalyst, the combination, with a rotary drum, of means for supplying a reducing gas to said drum, means for withdrawing the said gas and the gases produced by the reaction from said drum, and means for removing the foreign matter from the gases withdrawn from the drum, and returning said matter to the drum, and means for returning the reducing gas to the drum.

2. In apparatus for producing a catalyst, the combination, with a rotary drum, of means for supplying a reducing gas to said drum, means for withdrawing the said gas and the gases produced by the reaction from said drum, and means for removing the dust from the gases withdrawn from the drum, and returning the dust to the drum, and means for returning the reducing gas to the drum.

3. In apparatus for producing a catalyst, the combination, with a rotary drum, of means for supplying a reducing gas to said drum, means for withdrawing the said gas and the gases produced by the reaction from said drum, means for removing the dust from the gases withdrawn from the drum, and means for returning the dust to the drum.

4. In apparatus for producing a catalyst, the combination, with a rotary drum, of means for supplying a reducing gas to said drum, means for withdrawing the said gas and the gases produced by the reaction from said drum, means for drying and revivifying the gases withdrawn from the drum, and means for returning the dried and revivified gas to the drum.

5. In apparatus for producing a catalyst, the combination, with a rotary drum, of means for supplying a reducing gas to said drum, a tube connected with said drum, and a screw-conveyer located within said tube and adapted to separate the dust from the gases withdrawn from the drum, and means for returning the dust into the drum.

In testimony, that I claim the foregoing as my invention, I have signed my name in presence of two subscribing witnesses.

MOSE WILBUSCHEWITSCH.

Witnesses:
HENRY HASPER,
WOLDEMAR HAUPT.